(No Model.)
J. H. BAUSER.
NUT LOCK.
No. 578,194.  Patented Mar. 2, 1897.
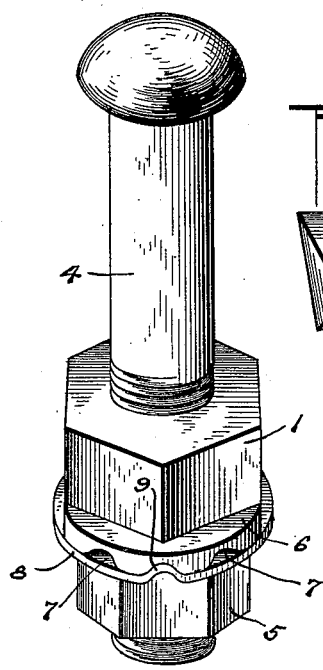
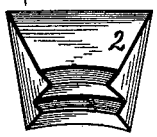
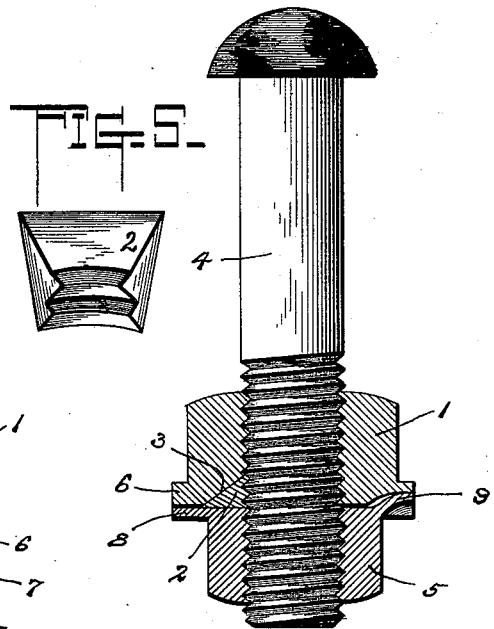
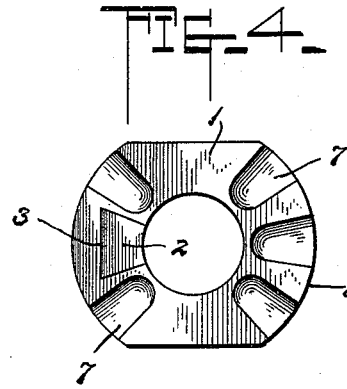
Witnesses
Inventor
John H. Bauser,
By his Attorneys,

UNITED STATES PATENT OFFICE.

JOHN HENRY BAUSER, OF GREENVILLE, PENNSYLVANIA.

NUT-LOCK.

SPECIFICATION forming part of Letters Patent No. 578,194, dated March 2, 1897.

Application filed August 31, 1896. Serial No. 604,489. (No model.)

*To all whom it may concern:*

Be it known that I, JOHN HENRY BAUSER, a citizen of the United States, residing at Greenville, in the county of Mercer and State of Pennsylvania, have invented a new and useful Nut-Lock, of which the following is a specification.

My invention relates to nut-locks particularly adapted for use in connection with bolts used in machinery and liable to be subjected to repeated or continuous jarring; and the object in view is to provide such a construction and arrangement of parts as to insure the permanency of adjustment of the main and lock nuts and yet adapt them to be removed with facility when necessary.

Further objects and advantages of this invention will appear in the following description, and the novel features thereof will be particularly pointed out in the appended claims.

In the drawings, Figure 1 is a perspective view of a bolt and nuts, showing a locking device constructed in accordance with my invention. Fig. 2 is a central sectional view of the same. Fig. 3 is a sectional view of the main nut upon a plane at right angles to that shown in Fig. 2. Fig. 4 is a plan view of the main nut. Fig. 5 is a detail view in perspective of the locking-block detached.

Similar numerals of reference indicate corresponding parts in all the figures of the drawings.

The main nut 1 carries a thread-engaging block 2, which is fitted to slide in an inclined seat 3, said seat being cross-sectionally dovetailed in plan and in elevation, whereby while the block is adapted to move freely in a direction parallel with the inclined floor of the seat, said floor extending from the outer surface of the nut to the bore thereof, it is positively held from displacement by the overhanging portions of the walls thereof. This block is so constructed that when its threaded or toothed inner side is flush with the contiguous portion of the bore of the nut, and hence is in engagement with the threads of a bolt 4, upon which said nut is fitted, the outer or plane surface thereof will be approximately in the plane of the contiguous surface of the nut. In practice the block is made of such size that its outer plane surface will project slightly beyond the contiguous surface of the nut, whereby when the lock-nut 5 is screwed to place it will bear against the outer plane surface of the block, and thus force the latter into positive frictional contact with the threads of the bolt and will thereby lock the main nut firmly upon the bolt at the desired adjustment. Inasmuch as the block is threaded or serrated at its inner end to accurately fit the threads of the bolt, it will be obvious that no injury to said bolt-threads can result from the tightening of the lock-nut.

In order to secure the lock-nut against rotation independently of the main nut after the desired adjustment of the parts has been attained, various means may be employed; but I prefer to construct the main nut with a peripheral flange or enlargement 6, having upon its exterior surface a series of depressions or radial grooves 7, into one of which is adapted to be forced the contiguous portion of a pliable web or lip 8, formed on the lock-nut. The depressions or grooves 7 are cross-sectionally beveled, whereby when it is desired to remove the nuts a force may be applied to the lock-nut by means of a wrench, which is sufficient to straighten the inwardly-bent projection 9 of the web or lip by contact with the beveled walls of the grooves.

It is obvious that in order to prevent the parts from jarring loose it is sufficient to form a bend or projection in engagement with one of the depressions or grooves by striking the contiguous portion of the web or lip with a hammer or similar tool, and in subsequent applications of the nuts different portions of the web or lip will be forced into engagement with the depressions to avoid unnecessarily weakening one portion thereof. In other words, by employing a plurality of depressions in the main nut the device is adapted for repeated use without necessitating the bending of the web or lip at the same point more than once. When the lock-nut is backed out of contact with the main nut, the locking-block may be loosened to allow the main nut to be removed.

Various changes in the form, proportion, and the minor details of construction may be resorted to without departing from the spirit or sacrificing any of the advantages of this invention.

It will be understood that any suitable material may be employed in the construction of the device embodying my invention; but steel is preferred for the thread-engaging block 2 in order that the crowding thereof into the thread of the bolt is insured.

Having described my invention, what I claim is—

1. A nut provided with a locking-block mounted to slide in an inclined direction upon the nut and having a threaded or serrated inner end to engage the threads of a bolt upon which the nut is fitted, and adjustable means for applying pressure to the outer end of the locking-block to force its inner end into frictional contact with the bolt, substantially as specified.

2. A main nut having a cross-sectionally dovetailed seat provided with an inclined floor, a locking-block fitted to slide in said seat with its inner end serrated or threaded to engage the threads of a bolt and with its outer plane extremity exposed at the contiguous surface of the nut, a lock-nut adapted to bear against said plane extremity of the block, and means for securing the lock-nut against independent rotation, substantially as specified.

In testimony that I claim the foregoing as my own I have hereto affixed my signature in the presence of two witnesses.

JOHN HENRY BAUSER.

Witnesses:
WM. LONG,
ANSON T. CLARK.